United States Patent [19]

Greene

[11] 4,040,374
[45] Aug. 9, 1977

[54] AUTOMATIC PILOT FOR A SAILBOAT

[75] Inventor: Leonard M. Greene, Chappaqua, N.Y.

[73] Assignee: Safe Flight Instrument Corporation, White Plains, N.Y.

[21] Appl. No.: 636,834

[22] Filed: Dec. 2, 1975

Related U.S. Application Data

[63] Continuation-in-part of Ser. No. 452,265, March 18, 1974, abandoned, which is a continuation of Ser. No. 220,768, Jan. 26, 1972, abandoned.

[51] Int. Cl.² .................. B63H 25/02; G05D 1/00
[52] U.S. Cl. .................. 114/144 C; 114/144 RE; 235/150.2; 318/588; 318/591
[58] Field of Search .................. 114/144; 235/150.2; 244/175, 196, 197, 184; 318/588, 590, 591, 647

[56] References Cited

U.S. PATENT DOCUMENTS

| | | | |
|---|---|---|---|
| 2,816,724 | 12/1957 | Snodgrass | 244/197 X |
| 3,140,436 | 7/1964 | Hatch | 114/144 E X |
| 3,361,392 | 1/1968 | Donieer et al. | 244/184 |
| 3,386,689 | 6/1968 | Parker et al. | 244/197 X |
| 3,505,577 | 4/1970 | Hirokawa | 114/144 E X |
| 3,656,043 | 4/1972 | Kawada et al. | 318/588 |
| 3,685,478 | 8/1972 | Casani et al. | 114/144 C |
| 3,696,282 | 10/1972 | Hirokawa et al. | 318/588 |

Primary Examiner—Stephen G. Kunin
Attorney, Agent, or Firm—Kirschstein, Kirschstein, Ottinger & Frank

[57] ABSTRACT

An automatic pilot for a sailboat includes a mode switching arrangement which permits a person to operate the sailboat in any one of several modes. One is the STEER mode, a second is the OFF mode, a third is the STANDBY mode, a fourth is the WIND mode and a fifth is the COMPASS mode. Another switching arrangement enables either the WIND mode or COMPASS mode to be operated in COURSE CHANGE sub-mode manners. Various mechanisms and circuitry further are included to enable the sailboat to be manually steered, to stabilize the rate of change of rudder position, to null a control that is a function of the change in heading error, to wash out certain signals under certain conditions, to inhibit certain signals under certain conditions, and to provide a steering command that furnishes a visual direction to the steersman when the automatic pilot is in a COURSE CHANGE sub-mode.

6 Claims, 10 Drawing Figures

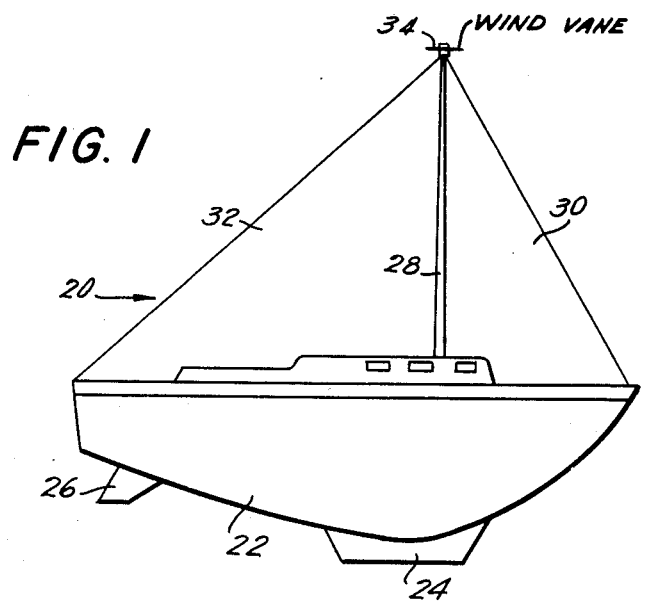

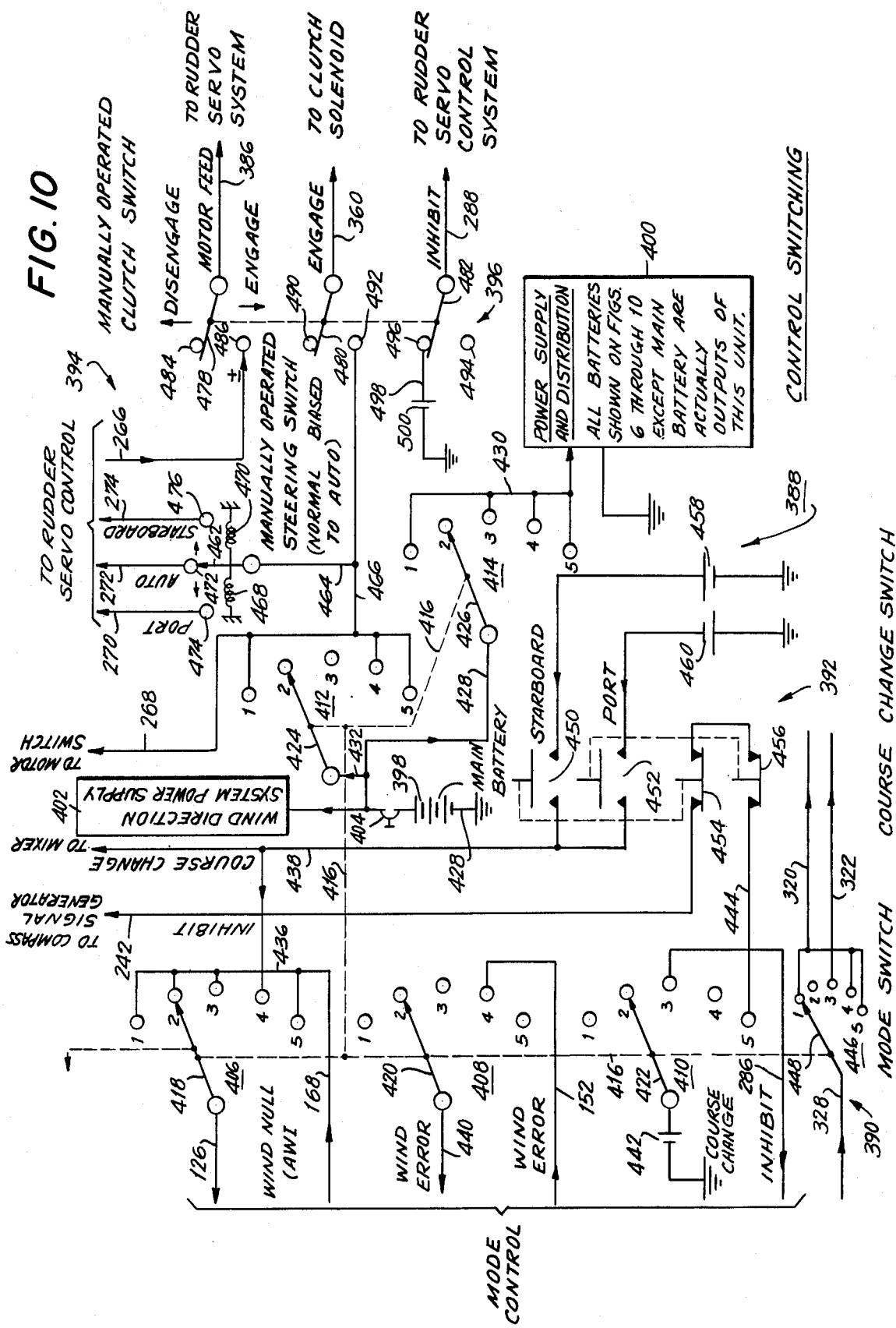

AUTOMATIC PILOT FOR A SAILBOAT

CROSS-REFERENCE TO RELATED APPLICATIONS

This application is a continuation-in-part of prior co-pending application Ser. No. 452,265 filed Mar. 18, 1974 for AN AUTOMATIC PILOT FOR A SAILBOAT, now abandoned which prior application is a continuation of application Ser. No. 220,768 filed Jan. 26, 1972 for AN AUTOMATIC PILOT FOR A SAILBOAT, now abandoned.

BACKGROUND OF THE INVENTION

1. Field of the Invention

An automatic pilot for a sailboat that furnishes a selection of various modes of operation.

2. Description of the Prior Art

Generally, automatic pilots for motorized sea vessels follow a compass heading, and deviation from that compass heading is mechanically coupled to a rudder to correct for the deviation. However, if one were to use a compass heading automatic pilot for a sailboat, efficient operation of the sailboat might be impeded. This is so since the sails generally are oriented and trimmed to make best use of the wind, and if there are changes in the direction of the wind, the sailboat would not be wind driven at maximum efficiency. Thus, the sailboat would make better overall headway if it were allowed to deviate from the compass heading in order to make the most effective use of the sails. It would therefore be desirable if a sailboat were allowed to move in such a way that the wind angle relative to the heading of the sailboat is kept constant.

Generally, electrically or electro-mechanically controlled automatic pilots may tend to over-react to minor and sudden changes in wind or sea conditions, and tend to unnecessarily activate the rudder, thus causing the wearing of the steering mechanism or uneven or wobbly movement of the sailboat. Furthermore, continuous rapid change in direction of movement of the rudder may tend to impart an oscillatory movement to the sailboat. Still further, movement by the rudder in an automatic pilot system often causes an over-correction in the heading of the sailboat, which again results in the need for further correction, wherein such continuous correction resembles a damped oscillation.

One attempt to furnish an improved automatic pilot for the steering of a sailboat is shown in U.S. Pat. No. 3,685,478. This, however, does not provide a mode switching arrangement to enable different types of steering to be provided, these including a STEER mode, an OFF mode, a STANDBY mode, a WIND mode, and a COMPASS mode. Nor does this patent disclose a WIND mode which is capable of being altered to a COURSE CHANGE sub-mode. Nor does this patent disclose a COMPASS mode in which the sailboat is steered on a constant compass setting even if the required final rudder setting is one other than the initial rudder setting. Nor does this patent disclose a COURSE CHANGE sub-mode for the COMPASS mode. Nor does this patent disclose an automatic pilot which in the WIND mode or COMPASS mode can be made to furnish a command signal to enable a steersman to control the rudder under manual direction and yet maintain the correction signals furnished by the automatic pilot in its WIND mode and COMPASS mode so as to permit the sailboat to be steered by manual control and still retain the benefit of the WIND mode and COMPASS mode correction signals as well as to educate a steersman in the proper manner of handling a sailboat under either WIND mode conditions or COMPASS mode conditions.

SUMMARY OF THE INVENTION

Purposes of the Invention

It is an object of the invention to provide an automatic pilot for a sailboat which includes a switching arrangement to enable the sailboat to be used in a large number of modes such as STEER, OFF, STANDBY, WIND and COMPASS modes.

It is another object of the invention to provide an automatic pilot of the character described which includes a further switching arrangement to enable the sailboat to be operated in COURSE CHANGE sub-modes of the WIND and COMPASS modes.

It is another object of the invention to provide an automatic pilot of the character described which enables a sailboat to automatically be controlled by its rudder in such a manner as to use sails oriented and trimmed in a certain fashion for a specific set of conditions to be used efficiently when conditions change, the change possibly being either a change in apparent wind direction or a change in the sailboat heading that is caused, for instance, by changing water currents.

It is another object of the invention to provide an automatic pilot of the character described which can be employed not only for automatic manipulation of the rudder of the sailboat in a COMPASS mode and a WIND mode or sub-modes thereof, but further can be employed to furnish command signals for a steersman whereby to improve his skill in the handling of a sailboat under fluctuating ambient conditions.

It is another object of the invention to provide an automatic pilot of the character described which damps phugoid signals for the control of the rudder and, instead, furnishes as asymptotically damped movement to the rudder when a change in the position thereof is directed by the automatic pilot.

It is another object of the invention to provide an automatic pilot of the character described in which a rudder feedback signal is provided that has a "floating" neutral, i.e. null, so that the automatic pilot steering correction is always with respect to and about the required rudder trim.

It is another object of the invention to provide an automatic pilot of the character described in which an integrator or wash out circuit is provided for the rudder feedback signal which has two time constants, one for normal operation and one for a shorter time, the latter to be used for standby conditions, these assuring proper rudder trim when the automatic pilot is engaged regardless of the control mode.

It is another object of the invention to provide an automatic pilot of the character described in which a rudder control signal is provided that is responsive to the turning rate of the sailboat so as to prevent overshoots and the consequent phugoid signaling referred to above.

It is another object of the invention to provide a automatic pilot of the character described which includes a compass drive-repeater differential tracking loop, hereinafter identified as the compass signal generator, that assures that the automatic error control signal is zero when the automatic pilot is switched to the COMPASS mode.

It is another object of the invention to provide an automatic pilot of the character described in which the gain of the apparent wind control signal automatically decreases as the sailboat heading becomes downwind and increases as the sailboat heading becomes upwind.

It is another object of the invention to provide an automatic pilot of the character described in which a relative apparent wind direction repeater tracking loop, hereinafter identified as a relative apparent wind error signal generator, is provided that assures that the automatic error control signal is zero when the automatic pilot is switched to the WIND mode.

Other objects of the invention in part will be obvious and in part will be pointed out hereinafter.

BRIEF DESCRIPTION OF THE INVENTION

An automatic pilot for a sailboat which includes an apparent wind direction sensor, a sailboat heading sensor, a rudder position sensor, a rudder servomotor, and a control circuit including switching arrangements which are such that the heading of the sailboat can be controlled automatically so as to maintain the sailboat in a constat WIND mode or a constant COMPASS mode or in a STANDBY mode or in a STEER mode or in an OFF mode or in COURSE CHANGE sub-modes of the WIND and COMPASS modes. This is done by sundry loops which are described in detail in the PREFERRED EMBODIMENT OF THE INVENTION. It serves no useful purpose to outline the specifics of the control arrangement or of the sensing means and of the loops since the same are set forth under the heading PREFERRED EMBODIMENT OF THE INVENTION.

BRIEF DESCRIPTION OF THE DRAWINGS

In the accompanying drawings in which is shown one of the various possible embodiments of the invention:

FIG. 1 is a side elevational view of a sailboat to be controlled by an automatic pilot of the present invention, a wind vane which drives one of the sensors of the automatic pilot being shown in a typical location atop the mast;

FIG. 2 is a plan view of the sailboat in which there are illustrated relative angular positions of the wind vane and rudder with respect to the sailboat, as well as certain angles and legends necessary to an understanding of this invention;

FIG. 3 shows the velocity vectors of the true wind, the apparent wind and the sailboat heading;

FIG. 10 is a partially schematic circuit diagram of the control switching, which is used as a part of the sailboat automatic pilot.

PREFERRED EMBODIMENT OF THE INVENTION

Figure 4:
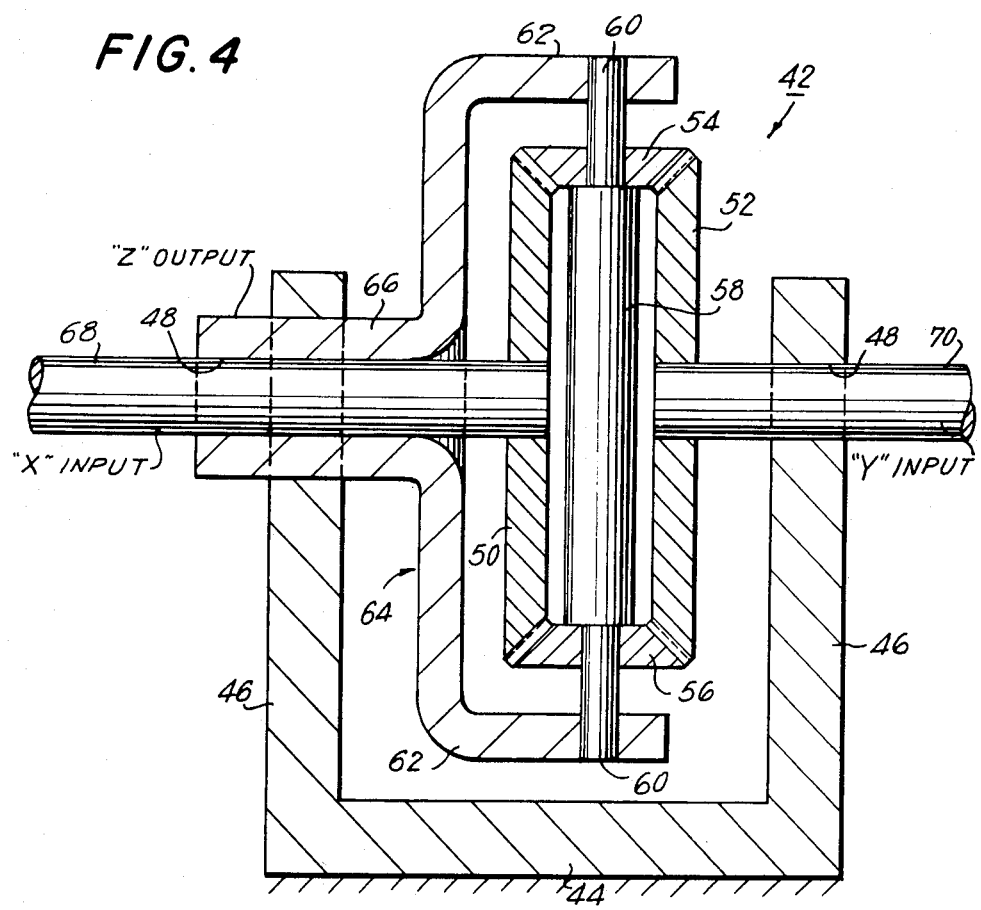
FIG. 4 is a sectional view of a differential gear which is used as a mechanical summing means in the compass signal generator, the circuit for which is illustrated in FIG. 7.

Referring now in detail to the drawings, and more particularly to FIG. 1, the reference numeral 20 denotes a sailboat of conventional configuration including a hull 22, a keel 24, a rudder 26, a mast 28, a jib 30, and a main sail 32. All of the foregoing elements have been schematically indicated.

A wind vane 34 constituting part of an apparent wind sensor is located in a suitable part of the sailboat which is clear of obstructions that will affect the direction of flow of the air mass surrounding the sailboat, for example on top of the mast. The wind vane is used to physically sense the apparent wind direction $W_A$ (see FIG. 2) which is the resultant of the true wind direction and the direction and speed of the sailboat. In order to determine this angle of the apparent wind $W_A$ with respect to the heading of the sailboat, the vector of the true wind velocity $V_{TW}$ (see FIG. 3) and the vector of the sailboat velocity $V_B$ are summed, the resultant being the vector of apparent wind velocity $V_{AW}$. This resultant is the direction in velocity of the apparent wind which is acting upon the sails of the salboat. Insofar as the present invention is concerned, the parameter of interest in the direction of the vector $V_{AW}$, i.e. the angular orientation of this vector. This is the orientation of the wind vane 34 at any given time. The wind vane angle which is the angle of the desired apparent wind $\theta_D$ is denoted by the vector 36 is FIG. 2. In this same figure, i.e. FIG. 2, the vector $H_T$ indicates the instantaneous heading of the sailboat and the vector $H_D$ indicates the desired heading. The angle $\Delta\theta$ in the same figure indicates the heading error. The angle $\theta_{W/V}$ which is the angle between the vector 36 and the vector $H_T$ constitutes the angle of the wind vane relative to the sailboat.

In FIG. 2 the vector 38 indicates the plane of the rudder 26 and the agle $\theta_R$ is the angle of rudder deflection.

Since there are forces acting on the sailboat that tend to turn it, such for example as water currents and wind playing on exposed portions of the hull as well as an imbalance of wind forces on the jib and main sail, the rudder must be properly positioned to hold a desired heading $H_D$ with respect to the apparent wind vector 36 or to the compass heading, depending upon the control mode, hereinafter described in some detail, in which the automatic pilot, likewise later described, is set. In most cases the largest force requiring rudder trim is the wind force vector at right angles to the instantaneous heading $H_T$ of the sailboat. The perturbations due to wave action and currents also cause the sailboat to swing, requiring continuous rudder movements. If the sea is absolutely calm with the water currents running steadily and if the wind is absolutely steady, there is a rudder position conveniently referred to as "neutral", and in more nautical language as "trim", which will counteract the turning moments due to such parameters as cross-wind and moving water currents and will keep the sailboat heading essentially correct. Under actual sailing conditions, there always is a rudder trim position; however, this position changes from time to time as ambient conditions change, so that the rudder must be moved about the rudder trim position to counteract perturbations in order to hold the average heading constant.

Pursuant to the present invention, there is provided an automatic pilot to which no reference numeral has been assigned inasmuch as it constitutes a combination of various elements which are illustrated in FIGS. 4 - 10. The purpose of said automatic pilot of the present invention is to take information (inputs) from the wind vane 34 and from a compass 40 (FIGS. 5 and 7) and to compare this information with the desired heading information and to control the rudder in view of the comparison so as to maintain the desired heading. FIG. 2 shows a sailboat whose instantaneous heading $H_T$ is not as desired. It is the function of the automatic pilot of the present invention in two of its modes of operation, heretofore, heretofore and hereinafter referred to as the WIND and COMPASS modes, to made use of the heading error information in moving the rudder so that the sailboat comes around (changes its heading) in order to reduce this error to zero and maintain the desired heading $H_D$.

Before describing the circuitry and many of the electronic components of the automatic pilot, a mechanical and an electro-mechanical component of said automatic pilot will be described with reference to FIGS. 4 and 5. The first of these two components is a standard component which can be purchased as an individual unit. In order to simplify the description of the invention, both said components now will be described.

FIG. 4 shows a mechanical summer in the form of a differential 42. This differential receives two rotary inputs and has one rotary output. A simplified differential which is here illustrated constitutes a base 44 having upstanding pedestals 46, the latter being provided with bearings 48 to accommodate shafts described below. The moving parts of the differential include four bevel gears 50, 52, 54, 56. The gears 50, 52 are in axial registration and opposed. The gears 54, 56 are in axial registration and opposed. The axes of rotation of the gears 50, 52 are perpendicular to the axes of rotation of the gears 54, 56 and these axes of rotation intersect at right angles. The gear 54 is in mesh with the gears 50, 52. The gear 56 is in mesh with the gears 50, 52 but 180° away from the meshing points of the gears 50, 52 with the gear 54. The gears 54, 56 are journaled on a common shaft 58 which extends between the inner faces of the gears 50, 52 and has its trunnion ends 60 journaled in bearings provided at the ends of arms 62 of a spider 64. The spider 64 is secured to a sleeve 66 which is journaled in the bearing 48 and extends beyond the same to constitute a Z output shaft. A shaft 68 is tied to the bevel gear 50 and is rotatably mounted within the bore of the sleeve 66, projecting outwardly beyond the same where it forms an X input shaft. A shaft 70 journaled in the bearing 48 is tied to the bevel gear 52. This shaft constitutes a Y input shaft.

Figure 5:
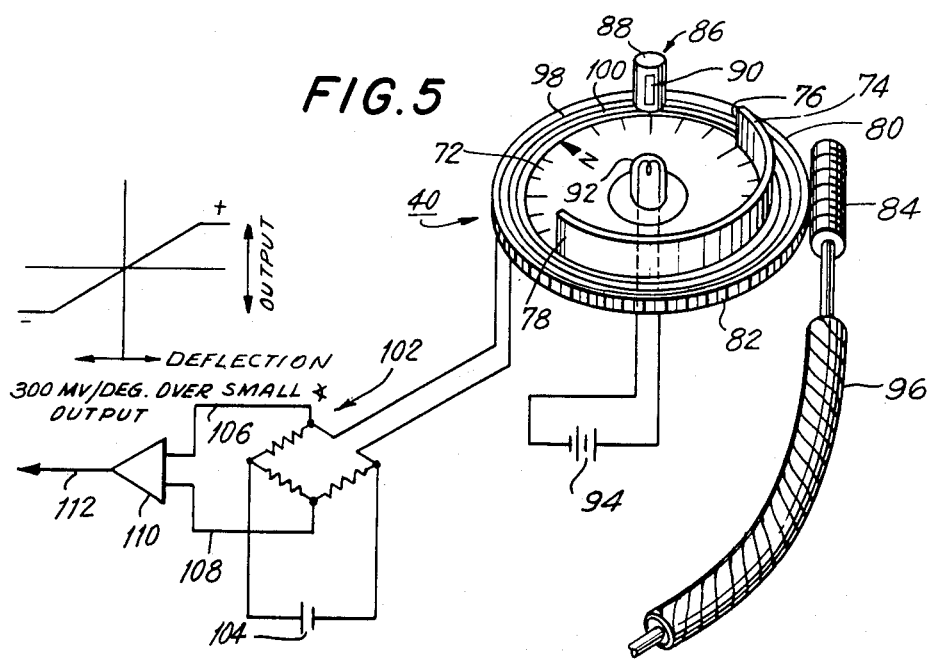
FIG. 5 is an electro-mechanical schematic view of a compass with an adjustable position pick-off which creates an electric signal that is used in the circuit of the compass signal generator illustrated in FIG 7.

In FIG. 5 there is shown a compass 40 with an adjustable position pick-off. Said compass constitutes a compass card 72 mounted for rotation about a vertical axis with respect to the sailboat so that it can turn in a horizontal plane. The compass card supports a fence 74 of a material which is impenetrable to light. The fence is mounted so as to be concentric about the vertical axis of rotation of the compass card and extends through an arc of 180°. The fence has a leading edge 76 and a trailing edge 78. Mounted concentrically about the axis of rotation of the compass card and rotatable independently thereof by means of an actuator, shortly to be described, is a ring 80 of electrically non-conductive material. The periphery of the ring is structured to provide a worm gear 82 which is drivingly engaged by a worm 84. Exemplificatively, the driving ratio of the worm and worm gear is 1 to 120. The ring 80 serves as a support for a photosensitive device such as a photosensitive resistor or a photocell 86 which is mounted in a housing 88 having an inwardly centrally facing vertical light input slit 90. A source of light such as an electric bulb 92 is supported at the center of the compass card so that light therefrom can play upon the photosensitive device 86 through the slit 90 regardless of the position of said device azimuthwise. The bulb is actuated steadily from a suitable source of electric energy indicated here as a battery 94.

It should be mentioned at this point that as the description proceeds of the sundry components which make up the automatic pilot, various batteries will be mentioned. These batteries are shown as individual power sources, but as later will be mentioned with respect to FIG. 10, the power sources are combined in that they are furnished from a single source usually with tap-offs for different voltages and/or different power requirements and/or different types of current, e.g. AC or DC, and optionally different frequencies.

The worm gear is driven by a flexible shaft 96.

The ring 80 is provided with concentric circular conductors 98, 100 which are connected to the output from the photosensitive device and which ride on the underside of the ring on slip ring brushes (not shown) to connect the photosensitive resistor 86 in a Wheatstone resistance bridge 102 energized by a battery 104 and having its output led over wires 106, 108 to a DC amplifier 110 having an output 112.

The characteristics of the compass 40 are shown in the small graph which is a part of FIG. 5 and which represents the relationship between the voltage input and the angular deflection which in the example given is 300 millivolts output per degree of deflection over small angles. In the operation of the compass, the shaft 96 will drive the ring 80 in a fashion such as to main the center of the slit 90 in radial alignment with the leading edge 76 as the position of the compass card varies with variations in the heading $H_T$ of the sailboat.

As previously indicated, FIGS. 6 - 10, considered jointly, constitute a circuit diagram in partially schematic form of one embodiment of the automatic pilot of the present invention. The system has four basic operational modes which are STEER, STANDBY, WIND and COMPASS, and one shut-down mode which is OFF. The rudder servosystem, that is to say, the servosystem which drives the rudder, can, with the present automatic pilot, receive and thereby be controlled by basic information from the apparent wind, the compass or manually directed power steering. Furthermore, the action of the rudder servosystem is stabilized by a rudder feedback circuit. Thus, referring to FIG. 8, it will be seen that there are four signals fed to a rudder servoamplifier, all of which will be described in more detail hereinafter, these signals including a compass error signal, a relative wind error signal, a course change signal and a rudder feedback signal. The sources of each of these signals and their mode of use for controlling the rudder servosystem will be practical hereinafter. There is also a fifth signal which is a rudder rate signal that conveniently is employed as a lead signal which causes the sailboat to asymptotically approach a desired heading.

Figure 6:
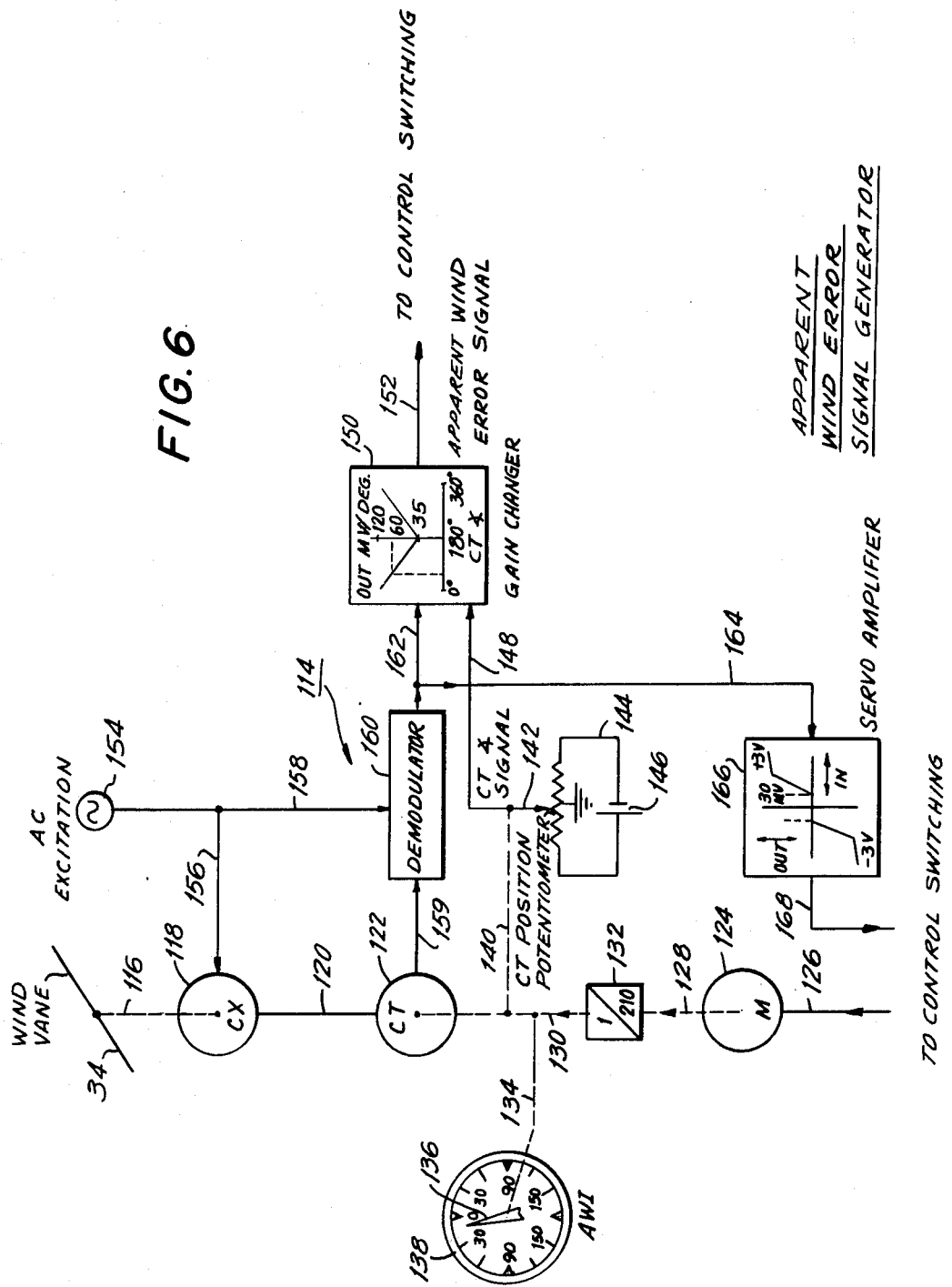
FIG. 6 is a partially schematic circuit diagram of the apparent wind error signal generator, also described as an apparent wind direction repeater tracking loop, which is used as a part of the sailboat automatic pilot.
Figure 8:
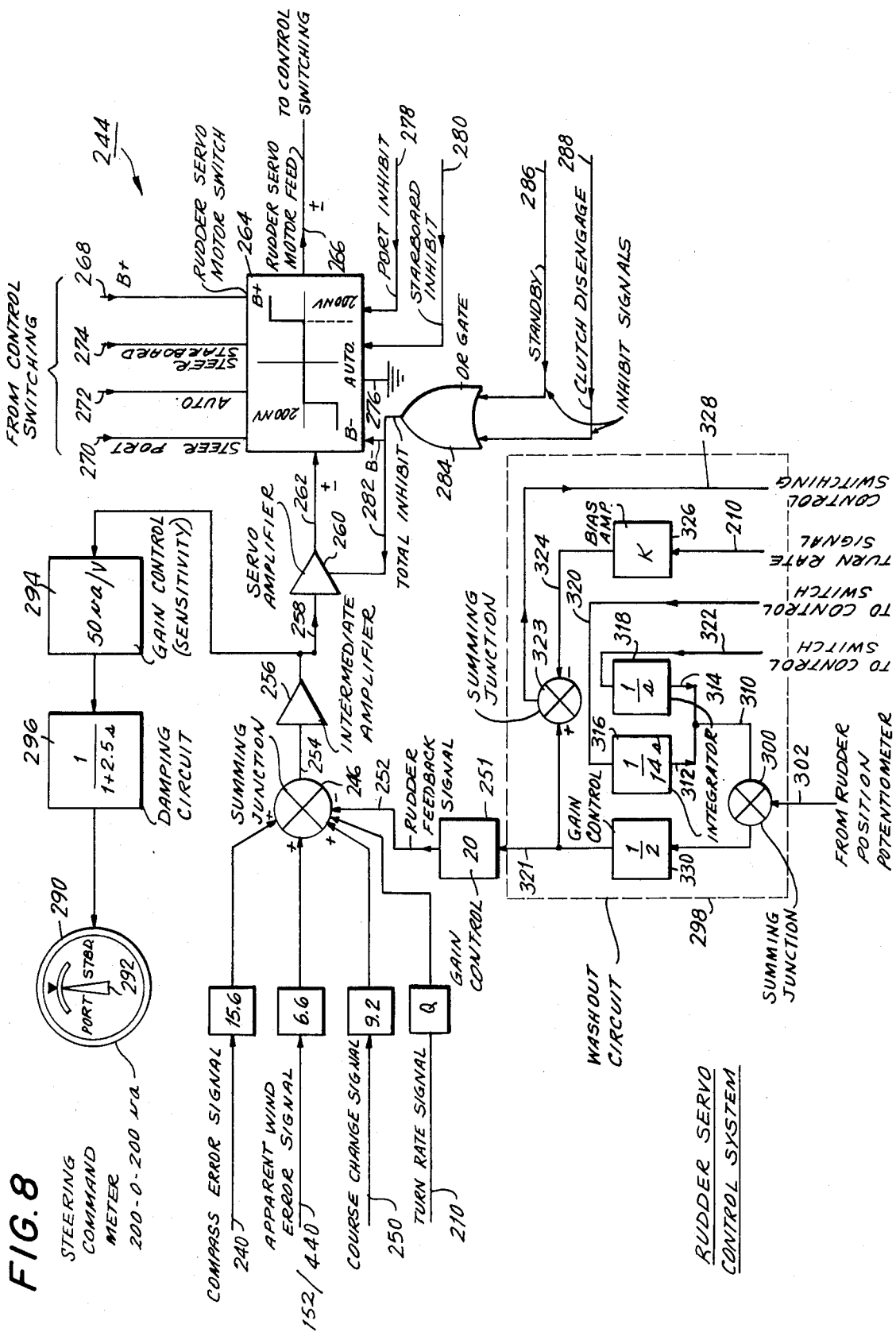
FIG. 8 is a partially schematic circuit diagram of the rudder servocontrol system, which is used as a part of the sailboat automatic pilot.

FIG. 6 shows an apparent wind error signal generator 114 that supplies one of the aforesaid signals mentioned with respect to FIG. 8. The generator includes one sensing element, to wit, the wind vane 34, which is mechanically coupled, i.e. kinematically connected as by a shaft 116, to a synchro transmitter CX 118. The transmitter generates a signal that is fed over a synchro cable 120 to a synchro control transformer CT 12. A servotracking motor M 124 which receives an input signal from a line 126 is mechanically connected to the synchro control transformer by a pair of shafts 128, 130 mutually coupled through gearing 132 exemplificatively shown as having a 210/1 reduction ratio. Another shaft 134 driven by the shaft 130 drives the needle 136 of an apparent wind indicator 138. Still another shaft 140 is coupled to the shaft 130 to drive the tap 142 of a CT position potentiometer 144 that is energized from a battery 146. The CT angle signal is derived from the tap 142, this obviously being a function of the CT angle which is indicated by the setting of the needle 136 of the apparent wind indicator. Said signal is fed over a line 148 to a gain changer 150 having a gain which is at a minimum when the sailboat is headed downwind (the 180° CT angle indicated on the graph located within the gain changer in FIG. 6) and which signal increases as the sailboat moves into the wind. It will be pointed out later that this type of output provided by the gain changer as a function of the CT angle provides an apparent wind error signal on the output line 152 from the gain changer that is a function of the wind vane angle, the change in gain just mentioned compensating for the increased sensitivity of the wind vane when the sailboat is headed downwind and for the decreased sensitivity of the wind vane when the sailboat is headed upwind. A source of AC excitation 154 is provided that is fed through a branch line 156 for excitation of the synchro transmitter 118 and along the line 158 to act as a reference for a demodulator 160 that has an input received from a line 159 on which an electric output from the synchro transmitter CX 118 appears. The demodulator has a DC output line 162. A line 164 branches off the line 162 to run a servoamplifier 166 the operational characteristics of which are indicated by the graph contained within the box denoting the servoamplifier. It will be seen that these characteristics are such that there is a dead band on the output for a null (zero) input thirty millivolts to both sides of the central position and that there are plus and minus three volt limit outputs. The entire apparent wind error signal generator 114 is upon occasion also referred to as an apparent wind direction repeater tracking loop. It will be understood that the graphs shown in the gain changer 150 and the servoamplifier 166 are only illustrative. It also should be mentioned that the specific nature of the AC excitation is not critical and any desired AC excitation may be used which is compatible with the apparent wind error signal generator. A typical satisfactory AC excitation is 26 volts at 400 Hz.

An output line 168 is provided for the servoamplifier 166. The input line 126 for the servotracking motor 124 and the output line 168 for the servoamplifier 166 are connected into the balance of the automatic pilot as shown in FIG. 10 where the joint signal is denoted by the expression "WIND NULL (AWI)". The expression "AWI" is upon occasion used herein as a symbol for the apparent wind indicator 138. It will be observed by reference to FIG. 10 that the output 168 from the servoamplifier 166 is fed back to the input 126 for the servotracking motor 124 in four out of five conditions of operation for the automatic pilot.

Although these conditions have been briefly mentioned before, it will simplify the understanding of the description if the various conditions are given numbers and the various conditions are identified by those numbers.

Thus, condition 1 (also position 1 for a mode switch hereinafter described and shown in FIG. 10) is the so-called "STEER" condition. In this condition the rudder is steered under manual control but through a rudder servosystem.

Condition 2 is the "OFF" condition in which the rudder is not under the control of the servosystem and in which all power is off except power to the AWI.

Condition 3 is the "STANDBY" condition in which the apparent wind error signal generator is operative and in which the compass signal generator and the computing circuits are operative, although they do not control the rudder servosystem.

Condition 4 is the "WIND" condition. In this condition the rudder servosystem is controlled by the wind error so that the sailboat is steered to correspond to a selected apparent wind signal.

Finally, condition 5 is the "COMPASS" condition in which the rudder servosystem is under the control of a selected desired heading for the sailboat.

It will be seen by tracing the circuit of the mode switch in FIG. 10 for wind null that in all conditions for the automatic pilot, save in condition 4, the WIND condition, the output signal on the lead 168 from the servoamplifier is fed back to the servotracking motor 124.

As long as power is supplied to the automatic pilot, the AWI 138 is active in all conditions, i.e., modes, of the automatic pilot system including OFF. The servotracking motor 124 is turned off when the automatic pilot is in the WIND mode (condition 4 as noted above). When said motor is turned off, the tracking of the synchro control transformer is halted so that an error signal is generated for the rudder control, as later will be apparent when FIGS. 8 and 10 are described. At all other times, however, which is to say, in conditions 1, 2, 3 and 5, i.e., STEER mode, OFF mode, STANDBY mode and COMPASS mode, the synchro control transformer 122 is tracking the synchro transmitter 118 so that the AWI 138 indicates the apparent wind direction $W_A$.

As recently mentioned, the error signal gain, which is a characteristic of the gain changer 150, is varied by the position of the synchro control transformer 122 in a manner such that the error steering sensitivity is minimal for a following wind and goes to a maximum when the sailboat is heading into the wind. Such feature is quite desirable since small relative wind angle changes have a much greater effect upon the speed of the sailboat when the sailboat is headed nearly into the wind than when it is being sailed before the wind.

Figure 7:
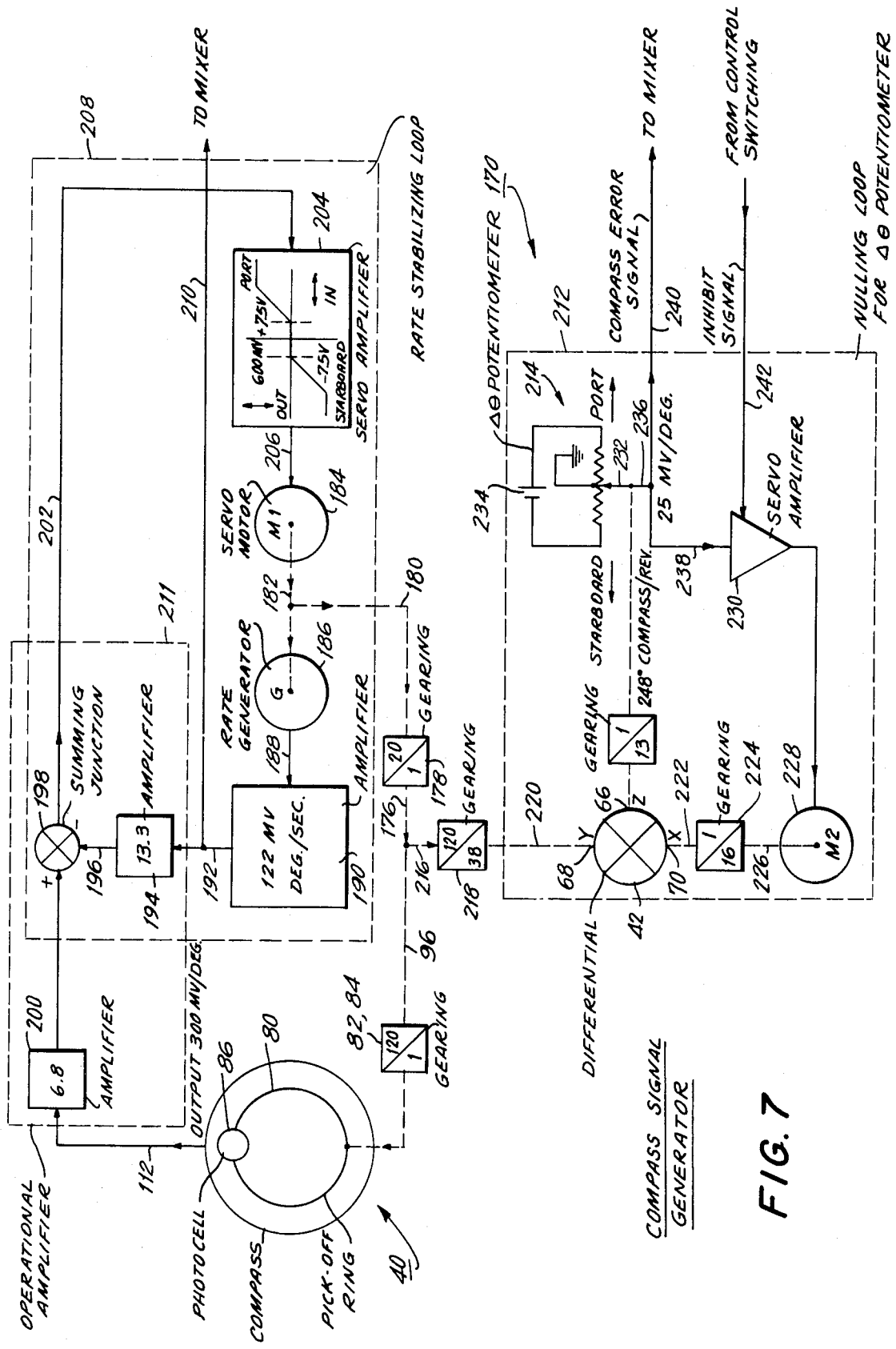
FIG. 7 is a partially schematic circuit diagram of the compass signal generator, also described as the compass drive-repeater differential tracking loop, which is used as a part of the sailboat automatic pilot.

Referring now to FIG. 7, the reference numeral 170, which constitutes the entire section of the automatic pilot shown in this figure, is the compass signal generator. In this figure the compass 40 schematically is indicated, as are the basic components thereof. Thus, the reference numeral 80 denotes the pick-off ring which is driven by the worm 84 (see FIG. 5) and which carries the photosensitive device 86. This ring is turned through the worm 84 just mentioned by the flexible cable 96 constituting a reduction gearing 82/84, here exemplificatively shown as having a 120/1 ratio. The shaft 96 is driven by a shaft 176. The shaft 176, in turn, is driven through a reduction gearing 178, here exemplificatively shown as having a 20/1 ratio. The gearing 178, in turn, is driven by a shaft 180 mechanically coupled to a shaft 182. Said shaft 182 is driven by a servomotor M1 184 that through the shaft 182 drives a rate generator 186. The output on a line 188 from the rate generator is led to an amplifier 190 which exemplificatively has an output of 122 millivolts per degree per second, or, in other words, 122 millivolts per degree in change in the heading of the sailboat per second, this being a rate function. The amplifier 190 has an output line 192 that leads to an amplifier 194 from which an output line 196 is fed into a summing junction 198. An exemplificative gain for the amplifier 194 is 13.3. Also fed to the summing junction 198 is the output from the amplifier 200, this, of course, being an output which is a function of compass position and appears on the output line 112. This latter output passes through an amplifier 200 exemplificatively having a gain of 6.8. The output from the summing junction appears on a line 202 which is fed into a servoamplifier 204 having the characteristics indicated by the graph contained within the box indicating that amplifier. It will be seen that there is a dead band of 600 millivolts on each side of null position and there is a limit output of 7.5 volts in extreme port and starboard positions at which the voltage output is exemplificatively plus or minus 7.5 volts. The maximum voltage for port is positive and for starboard is negative. The voltage appearing at the output of the servoamplifier 204 on a line 206 is fed to and drives the servomotor 184 that, it will be recalled, is mechanically coupled to the rate generator 186. The portion of this circuit constituting the rate generator 186, the amplifier 190, the amplifier 194, the summing junction 198, the servoamplifier 204 and the servomotor 184 comprises a closed loop 208 which functions as a rate stabilizing loop. A turn rate signal is picked off from the output line from the amplifier 190, the pick-off being conducted along a line 210 which, as will be seen subsequently in the description of the rudder servocontrol system illustrated in FIG. 8, is one of the sundry signals which controls the rudder servosystem.

The two amplifiers 194 and 200 and the summing junction 198, considered jointly, constitute an operational amplifier 211. Also included in the compass signal generator 170 is a nulling loop 212 for a potentiometer 214 which furnishes a signal as a function of the heading error $\Delta \theta$ (see FIG. 2). The nulling loop is driven by a shaft 216 through a reduction gearing 218 whose output shaft 220 furnishes the Y drive 70 (see FIG. 4) for the differential 42. The X drive 68 for said differential is received from a shaft 222 that is turned by a reduction gearing 224 (exemplificatively with a ratio of 16 to 1) which is coupled by a shaft 226 to the output of a motor M2 228. The motor is electrically driven by a servoamplifier 230 which is driven from the tap 232 of the potentiometer 214. The potentiometer is powered by a battery 234. Exemplificatively, the potentiometer is designed to provide an output of 25 millivolts per degree of compass setting. The connection between the tap 232 and the input to the servoamplifier 230 is through a pair of lines 236, 238. The signal from the $\Delta \theta$ potentiometer 214 also appears on a line 240 which is one of the inputs to the rudder servocontrol system illustrated in FIG. 8.

The servoamplifier has an additional input line 242 which, when a signal appears thereon, will inhibit the operation of the servoamplifier and thereby halt the motor M2 228. This signal, as later will appear from FIG. 10, is created when the mode switch is in its COMPASS condition (condition 5).

If the motor M2 is inhibited because of an inhibit signal appearing on the line 242, the motor M1 will drive through shafts 182, 180, gearing 178, shafts 176 and 96, and gearing 82/84, the compass position pick-off ring 80 until the compass card 72 and the pick-off are aligned. At this time, no error signal appears on line 202, causing the motor 184 to stop. The rate generator 186 in the rate stabilizing loop is used to make the ring turning rate proportional to the error signal which stabilizes the loop. As mentioned previously, the servoamplifier 204 has a small dead band to quiet the operation of the compass ring 80. The motor M1 184 also, as will be seen, drives the $\Delta \theta$ potentiometer 214 through the differential 42. Therefore, the position of said potentiometer is a function of the change of compass card position from the time of the inhibit. Upon removal of the inhibit signal on the line 242 feeding the motor M2 228, said motor, which has an X input into the differential 42, will center the potentiometer. The overall operation results in a tracking effect thereby, regardless of the compass card position, the potentiometer will be centered, which is to say, "nulled". Whenever the automatic pilot is in the COMPASS mode (condition) the motor M2 228 is inhibited. Therefore, at this time the output of the $\Delta \theta$ potentiometer 214 is the error signal which represents the deviation of the heading of the sailboat $\Delta \theta$ from the heading $H_D$ that existed when the automatic pilot was placed in the COMPASS mode (condition 5). In actual use, the sailboat is stabilized in the STANDBY mode (condition 3) at the desired heading. At this time the $\Delta \theta$ potentiometer 214 output will have nulled itself. Now the automatic pilot can be placed in the COMPASS mode (condition 5) for automatic steering.

Figure 9:
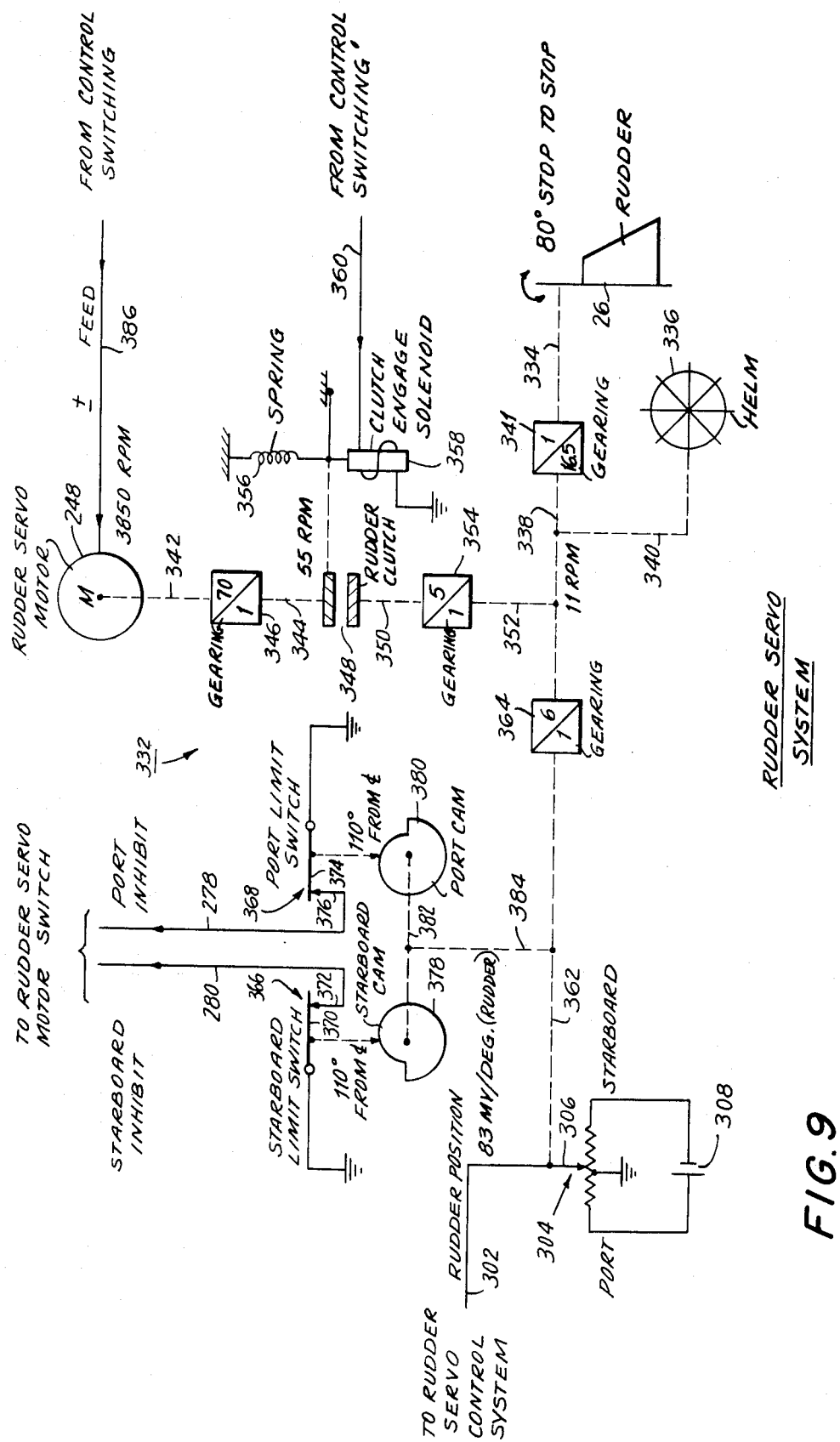
FIG. 9 is a partially schematic circuit diagram of the rudder servosysten, which is used as a part of the sailboat automatic pilot.

Referring now in detail to FIG. 8, the reference numeral 244 shows the entire portion of the automatic pilot which constitutes the rudder servocontrol system. In this figure several signals are fed to a summing junction 246 as mentioned previously, this being the summing junction which, through other instrumentalities soon to be described, and through control switching, likewise to be described, regulates the rudder 26 through a rudder servomotor M 248 (see FIG. 9). Three of the signals already have been mentioned, these constituting a compass error signal appearing on the line 240 (see FIGS. 7 and 8), an apparent wind error signal appearing on the lines 150/442, 152/440 (see FIGS. 6 and 8), a rudder rate signal appearing on the line 210 (see FIGS. 7 and 8), a course change signal appearing on the line 250, the source of which signal will appear later, and a rudder feedback signal appearing on the line 252, the source of which will be described with reference to FIG. 8 now under consideration. The output from the summing junction is fed on a line 254 to an intermediate amplifier 256, the output from which is supplied via a line 258 to the input of a servoamplifier 260. The output from the servoamplifier is carried by a line 262 to a rudder servomotor switch 264 which actually is a form of gain control having a bang-bang characteristic curve such as shown within the block that denotes such switch. It there will be seen that there is a large dead band in the order of 200 millivolts to each side of a null for the input to the switch 264. When this is exceeded, the output from the switch suddenly rises to a high positive (B+) or to a high negative (B−) voltage that is supplied to the line 266 which runs to the control switching portion of the automatic pilot shown in FIG. 10 and through the control switching to the rudder servomotor 248 (FIG. 9). The rudder servomotor switch has several inputs other than that of the servoamplifier 260. These include a positive power source (B+) that is supplied by the line 268 and a negative power source (B−) and three input lines 270, 272 and 274 on which voltages in excess of 200 millivolts are applied from the control switching (FIG. 10), said lines being under the regulation, insofar as port and starboard steering are concerned, of an operator, the neutral position of the rudder control switching being the automatic (auto) position in which the line 272 is the only line energized. Further inputs to the rudder servomotor switch are a ground line 276, a port inhibit line 278, and a starboard inhibit line 280. These latter two lines derive their signals from the correspondingly numbered lines on FIG. 10 which is the control switching.

A further control of the rudder is supplied through the servoamplifier 260 over a total inhibit line 282 which represents the output of an OR gate 284 to which the inputs are two inhibit signals appearing on a standby inhibit line 286 and a clutch disengage inhibit line 288. These signals are furnished from the control switching (FIG. 10).

A further feature of the automatic pilot is the provision of an arrangement for enabling the steersman to, in effect, act as a part of the control loop for operating the rudder through the helm 336 in such a manner as to obtain maximum efficiency of operation of the sailboat under various conditions. For this purpose, there is provided, as shown in FIG. 8, a steering command meter 290 exemplificatively shown as having a range of 200 μa on both sides of a null point. The swing of the indicator 292 of this meter to one side of the null point is a command to the steersman to steer port, and to the other side to steer starboard. In other words, this is not a meter which indicates a certain heading of the sailboat but, rather, is a meter which directs a steersman to steer in a certain direction in order to have the rudder assume a position that will obtain a maximum efficiency of operation of the sailboat under specific conditions such, for instance, as steering to a specific heading (COMPASS condition 5) or steering to obtain a desired apparent wind angle. The feed to the steering command meter is taken from the line 258, passing first through a gain control (sensitivity) 294 and then through a damping circuit 296. Exemplificatively, the gain control has a characteristic of 50 μa/v and the damping circuit has a characteristic of $(1/1+2.5s)$.

It is desirable to include a wash-out arrangement shown in FIG. 8 as a wash-out circuit 298 to supply the rudder feedback signal. This circuit comprises a summing junction 300 which receives an input signal on a line 302 from a rudder position potentiometer 304 shown in FIG. 9, said potentiometer having a tap 306 which furnishes voltage to the line 302 as a function of rudder position through a suitable control linkage described in connection with the rudder servosystem of FIG. 9. Power is supplied to the rudder position potentiometer from a battery 308.

Another input to the summing junction 300 appears on line 310. This input is selected from between two sources of signal, depending upon the position of the mode switch. The line 310 is fed from twin lines 312 and 314. The line 312 is the output of an integrator 316, and the line 314 is the output of an integrator 318. The characteristics of the two integrators are denoted by the symbols contained within the boxes denoting the same, the time constant for the integrator 316 being the coefficient 14 for s in the transfer function $(1/14s)$ and the time constant for the integrator 318 being the coefficient unity for s in the transfer function $(1/s)$. The integrator 316 receives its signal over a line 320, and the integrator 318 receives its signal over a line 322. These lines are connected to the control switching (FIG. 10) where the same numbers apply to corresponding lines.

Another summing junction 323 is provided in the washout circuit. A signal to this summing junction 323 appears on line 324. This input is derived from the turn rate signal line 210 (FIG. 7) after having been amplified by a bias amplifier 326. Another signal to the summing junction 323 is supplied from the line 321 that runs between gain controls 251 and 330.

The output from the summing junction 323 is conducted over a line 328 to the correspondingly numbered line in the control switching (see FIG. 10).

In the rudder servocontrol system 244 the summing junction 246 receives error, i.e. control or drive signals, from the wind, compass, course change and turn rate functions on the lines 440, 240, 250 and 210, respectively, it being understood that the wind signal is an apparent wind error signal $(\theta_D)$ and that the compass signal is a compass error $(\Delta\theta)$ signal. The signal received will depend upon the selected operating mode as determined by the position of the mode switch subsequently described. The course change function and signal (subsequently described) is a manually activatable rudder control such as a port-and-starboard switch which, when actuated, places the compass control system in the self-nulling, i.e. tracking, condition when the automatic pilot is in the COMPASS condition (mode switch position 5) or moves the wind reference (the synchro control transformer CT 122) to a new value when the automatic pilot is in the WIND condition (mode switch position 4). Actuation of said switch drives the rudder in the direction to achieve the desired heading when a COURSE CHANGE condition is effected in either the WIND or the COMPASS condition. When said switch is released, the automatic pilot resumes control of the sailboat for the new desired heading in either the WIND or COMPASS setting of the mode switch.

A fourth signal, as noted above, is supplied to the summing junction 246 along the line 252, this being a negative feedback signal which washes out as the corrections for rudder position become zero.

A fifth signal, which is the turn rate signal appearing on line 210, is a lead signal which insures that the approach to null position of the rudder is asymptotic.

As will be apparent, a rudder position signal on the line 302 from the rudder position potentiometer 304 first goes through the summing junction 300, then through a gain control circuit 330 (having an exemplificative gain of ½) to the summing junction 323 and also to the gain control 251, having an exemplificative gain of 20, from which the output appears on the line 252. The feedback signal on the line 252 opposes any one of the three principal drive signals on the lines 440, 240 or 250 to stabilize the system. It is pointed out that this negative feedback signal is only responsive to changes in rudder position since the rudder may be in trim or any other position. The signal simply serves to stabilize operations as the rudder moves about its trim position.

In all modes, i.e. conditions, of operation as selected by the mode switch, except OFF and STANDBY, the normally longer period (1/14s) "wash-out" circuit is used. This assures that the rudder feedback signal is washed out at the correct rate for the configuration and dynamics of the sailboat 20. The shorter period (1/s) activated in the STANDBY mode provides quick stabilization of the rudder position for any subsequently selected principal modes.

In addition to the wash-out circuit period changes for various modes, a turn rate signal, as mentioned above, is continuously fed into the summing junction 246 from the line 210, the signal being derived from the rate stabilizing loop (see FIG. 7). Such signal is so arranged that at any time that the sailboat is actually turning, which is to say, experiencing a change of course, whatever be the motivating force, the rudder feedback wash-out circuit is inhibited and the integrator is held. This results in the rudder position signal being fed into the servosystem summing junction 246 in opposition to the individual or combinations of error signals, depending upon the mode selected. This function is to negate rudder runaway and to insure proper trim when the sailboat no longer is turning.

The steering command meter 290 constitutes a display located in a position convenient for reading by the steersman. For example, it may be placed in the cockpit of the sailboat with other instrumental displays. Said steering command meter is connected to the input circuit to the servoamplifier 260 that actuates the rudder in a bang-bang manner. Whenever the automatic pilot is in a WIND or COMPASS condition (positions 4 or 5 of the mode switch), the command meter shows the applicable error signal $\Delta\theta$ in a continuous fashion. Therefore, when it is not desirable or legal to use the automatic rudder, a rudder clutch, subsequently to be described, is disengaged and the steersman steers the sailboat by obeying the commands of the meter 290 which will assure attainment of the same optimum performance that would be secured if the automatic pilot wer controlling the sailboat, e.g. in a WIND or COMPASS condition of the mode switch.

It further will be apparent that the output from the summing junction 246 is fed to the servoamplifier 260 through the intermediate amplifier 256. The servoamplifier, for reasons of better control, does not directly drive the rudder servomotor 248 (FIG. 9). Rather, it controls a switching system which constitutes the rudder servomotor switch 264 that, in turn, drives the rudder servomotor at full speed, either starboard or port, this being the bang-bang manner of rudder actuation. The switch 264 can be completely inhibited against operation by a clutch engage circuit (subsequently described) via the line 288, the OR gate 284 and the line 282. It also is completely inhibited when the automatic pilot is in he STANDBY condition via the line 286, the OR gate 284 and the line 282. Furthermore, the switch 264 can be inhibited from driving the rudder either starboard or port by rudder limiting switches which soon will be described with reference to FIG. 9.

At any time, except when the mode switch is in the OFF condition or the STANDBY condition (positions 2 or 3), a hand-operable steering switch, to be described with respect to FIG. 10, can be actuated to drive the rudder either right or left. When the sailboat is being automatically steered by the automatic pilot, which is to say, when the manually-operable steering switch is in the "automatic" condition, actuation of the manually-operable steering switch will drive the rudder either way, depending upon the manner in which the switch is operated, i.e. whether the switch is moved to either port or starboard position. The automatic control of the sailboat is disabled when the manually-operable steering switch is thrown to either port position or starboard position. Such operation is called "dodging" and is employed, for instance, when a steersman sees an obstacle immediately ahead of the bow when the sailboat automatically is being piloted. Upon release of the manually-operable switch, an automatic mode will take over command and restore the sailboat to its original heading.

When the automatic pilot is in the STEER condition (position 1), a clutch, to be described with reference to FIG. 9, can be engaged and the manually-operable steering switch, just mentioned (FIG. 10), employed to steer the sailboat. It will be observed that the aforesaid clutch cannot be engaged with the mode switch is in either the OFF or the STANDBY condition. Upon release of the manually-operable switch, the rudder now will remain in its new position.

Referring now in detail to FIG. 9, the reference numeral 332 denotes the entire section of the automatic pilot which constitutes the rudder servosystem. The rudder is mechanically coupled to a shaft 334. A steering wheel, i.e. helm 336, is coupled to a shaft 338 through a shaft 340. The shaft 338 drives the shaft 334 through a step-down gearing 341 exemplificatively having a ratio of 16.5/1. The shaft 338 is turned by the rudder servomotor M 248. However, this turning is not direct. Specifically, the motor 248 turns a shaft 342 which, in turn, drives a shaft 344 through a step-down gearing 346 exemplificatively having a 70/1 ratio. The shaft 344 drives the input side of a clutch 348, the output of which drives a shaft 350. The shaft 350 drives a shaft 352 through a step-down gearing 354 exemplificatively having a 5/1 ratio. The rudder clutch 348 is held in a normally disengaged condition as by a spring 356 and can be moved to engaged position as by a clutch engage solenoid 358, power to which is supplied over a line 360. This line will also be seen in FIG. 10 which is a diagram of the control switching. The shaft 352 is coupled to the shaft 338 so that when the rudder servomotor is turned and the clutch engage solenoid is actuated, the rudder servomotor will turn the rudder.

An electric signal which is a function of the angle of the rudder, i.e. of the rudder position, appears on the line 302, being derived from the tap 306 of the rudder position potentiometer 304. This tap is driven by a shaft 362 that is connected through a gearing 364 to the shaft 338. The gearing 364 is a step-down gearing in a direction from the shaft 338 to the shaft 362, the ratio exemplificatively being 6/1. The shaft 338 is shown as having a turn rate of 11 rpm so that the turn rate of the rudder is 11/16.5 rpm. This is based on a turn rate of 3850 rpm for the rudder servomotor and step-down ratios of 70/1 and 5/1 for the gearings 346 and 354. The rate of turn of the shaft 362 in the example shown is slightly less than 2 rpm.

For mechanical reasons, it is desirable to place limits on the rotation of the rudder. For this purpose, limit switches are included in the rudder servosystem. Two such switches are provided, to wit, a normally closed starboard limit switch 366 and a normally closed port limit switch 368. The starboard limit switch includes a blade 370 biased (by means not shown) against a contact 372. The port limit switch includes a blade 374 biased (by means not shown) against a contact 376. Both blades are grounded. The starboard limit switch is mechanically actuatable by a starboard cam 378 and the port limit switch is actuatable by a port cam 380. The two cams are tied to turn with a common shaft 382 which is coupled by a shaft 384 to the shaft 362 whereby, as the rudder turns, so does the shaft 382. Hence, the position of the shaft 382 is a function of rudder position. The cams are so designed, bearing in mind the various ratios of the gearing 340 and 364, that when the rudder turns 40° away from its center line position, either the starboard cam 378 or the port cam 380, depending on the direction of turning of the rudder, will open the starboard limit switch 366 or the port limit switch 368. The contacts 372 and 376 are respectively connected to the lines 280 and 278 which are respectively the starboard inhibit and the port inhibit lines to the rudder servomotor switch. When either of these limit switches is open, the rudder servomotor switch is inhibited and no signal in the limited direction will be fed from the line 266 or through the control switching to a feed line 386 for the rudder servomotor.

Referring now in detail to FIG. 10, the reference numeral 388 denotes the entire section of the automatic pilot which constitutes the control switching hereinbefore mentioned. The control switching essentially is a wired switching circuit which effects the sundry connections that have been frequently mentioned previously. The control switching includes a mode switch 390, a course change switch 392, a manually-operable steering switch 394, and a manually-operable clutch switch 396. The segment of the automatic pilot constituting the control switching further includes a main battery 398, a power supply and distribution source 400, and a power supply 402 for the wind direction segment of the automatic pilot. Finally, the control switching segment includes a circuitbreaker 404.

The mode switch includes five decks 406, 408, 410, 412 and 414, the taps of which are tied together by a common shaft 416, for convenience shown in FIG. 10 as being subdivided into kinematically interconnected segments. The deck 406 is a deck for the wind null. The deck 408 is a deck for the wind error. The deck 410 is a deck for the course change. The decks 412 and 414 are power decks. Each deck has a tap, respectively being 418, 420, 422, 424 and 426, and each tap is arranged to swing over and successively into and out of engagement with five contacts respectively denoted as 1, 2, 3, 4 and 5. These reference numerals are repeated for each deck and where a specific contact is to be described hereinafter it will be described with the number of the deck followed by a hyphen and the number of the contact.

The power supply and distribution 400 denoted as a block actually constitutes all sources of supply for power in FIGS. 6 - 10, except for the main battery 398, and also includes the source of AC excitation 154 (FIG. 6). A line 428 runs from a terminal of the main battery 398 (the other terminal of which is grounded) through the circuitbreaker 404, the line extending to the tap 426. The contacts 414-1, 414-3, 414-4 and 414-5 are connected through a line 430 having sundry branches to the power supply and distribution 400. Hence, when the mode switch is in any one of its 1, 3, 4 and 5 positions corresponding to STEER, STANDBY, WIND and COMPASS conditions, power will be supplied to that portion of the circuit which operates in such condition.

The line 428 also is connected by a line 432 to the tap 424.

The contacts 412-1, 412-4 and 412-5 jointly are connected through sundry branches to the line 268 which runs to the rudder servomotor switch (see FIG. 8) so that this switch is supplied with a source of B+ power in the first, fourth and fifth positions of the mode switch corresponding to STEER, WIND and COMPASS conditions. No power is supplied to the switch in the second and third positions, to wit, OFF and STANDBY, of the mode switch.

As will be apparent from the circuit, power is supplied constantly to the wind direction system i.e. the apparent wind error signal generator, in all positions of the mode switch except, of course, when the circuitbreaker 404 is open, for example, when the sailboat is docked.

Reverting now to the wind null (AWI) deck 406, contacts 406-1, 406-2, 406-3 and 406-5 are connected by a line 436 to the line 168 (see FIG. 6) which is the output of the apparent wind error signal servoamplifier 166 so that the signal from said servoamplifier is supplied to the line 126 (see FIG. 6) running to the servotracking motor 124 in positions 1, 2, 3 and 5 of the mode switch (STEER, OFF, STANDBY and COMPASS conditions). The contact 406-4 which is engaged in the fourth position of the mode switch (WIND condition) runs to a course change line 438 soon to be described in connection with the course change switch 392.

In the wind error deck 408, the contacts 408-1, 408-2, 408-3 and 408-5 corresponding to positions 1, 2, 3 and 5 of the mode switch (STEER, OFF, STANDBY and COMPASS conditions) are dead contacts. The only contact having a connection in this deck is contact 408-4 (WIND condition) which receives a signal over the lead line 152 (FIG. 6). The tap 420 of the wind error deck is connected to a lead line 440 which is the line connecting the apparent wind error signal to the summing junction 246 (see FIG. 8). Hence, when the mode switch is in position 4, the apparent wind error signal is fed from the apparent wind error signal generator 114 to the summing junction 246 of the rudder servocontrol system.

In the course change deck 410, the contacts 410-1, 410-2 and 410-4 corresponding to positions 1, 2 and 4 of the mode switch (STEER, OFF and WIND conditions) are dead contacts. The contact 410-3 is connected to the line 286 which is the standby inhibit for the OR gate 284 (FIG. 8) that shuts down the servoamplifier 260 when the mode switch is in STANDBY condition (position 3). The tap 422 is connected to a battery 442 which places potential thereon. The contact 410-5 is connected to a line 444 which runs to the course change switch 392.

There is a sixth deck 446 which also is operated along with all of the other decks by the common shaft 416. It has a tap 448 which is connected to the lead line 328 (see FIG. 8) which is the output line for the summing junction 323 in the wash-out circuit 298. The contact 446-2 is dead. The contacts 446-1, 446-4 and 446-5 are connected by a line having branches to the line 320 (see FIG. 8) in the wash-out circuit 298. The contact 446-3 is connected to the line 322 (see FIG. 8) in the wash-out circuit 298. Hence, in the STEER, WIND and COMPASS conditions the line 328 is connected to the integrator 316 having the time constant characteristic (1/14s), while in the STANDBY condition of the automatic pilot the line 328 is connected to the integrator 318 having the time constant characteristic 1/s.)

The course change switch 392 includes four sub-switches which constitute a normally open starboard switch 450, a normally open port switch 452, a normally closed starboard switch 454 and a normally closed port switch 456. The two starboard switches 450 and 454 are interconnected for common manual operation, being biased to the positions indicated in FIG. 10 and mentioned above. The same is true of the two port switches 452, 456, i.e. they are ganged for common actuation. The starboard switch 450 is in a circuit running from the course change line 438 to a battery 458. The port switch 452 is in a circuit running from the course change line 438 to a battery 460. The normally closed starboard switch 454 and port switch 456 are connected in series between the lines 242 (FIG. 7) and 444. Thereby when the mode switch is in its COMPASS condition, this being the fifth position of the mode switch, if neither course change switch is actuated a voltage is supplied to the line 242 of the compass signal generator (see FIG. 7) which furnishes an inhibit signal to the servoamplifier 230. However, when either of the switches 454, 456 is actuated while the mode switch is in its fifth position, operation of the servoamplifier 230 is not inhibited. In any of the first four positions of the mode switch, no inhibit signal is supplied to said servoamplifier.

The manually-operated steering switch 394 has a trap 462 connected by a line 464 to a line 466 which is joined to the line 268 whereby the line 464 is energized from the main battery in positions 1, 4 and 5 of the mode switch. The tap 462 is biased to a null position by opposed springs 468 and 470, and in such null position the tap engages a contact 472 connected to the line 272 that supplies a constant signal to the rudder servomotor switch 264 (FIG. 8) when the automatic pilot is in any one of modes 1, 4 and 5. The manually-operated steering switch 394 also has contacts 474, 476 on opposite sides of the automatic contact 472, the contact 474 being a port contact and the contact 476 being a starboard contact. These contacts respectively are connected to the lines 270, 274 that run to the rudder servomotor switch 264 (FIG. 8) for supplying overriding signals when the switch 394 is manually actuated. It is quite apparent that when the tap 462 is moved from the automatic contact 472 and to either the port contact 474 or the starboard contact 476, a continuous supply of power for automatic operation of the rudder servomotor switch is discontinued and power is supplied either to the steer port terminal or the steer starboard terminal of said switch 264.

The manually-operated clutch switch 396 has three ganged taps 478, 480 and 482, respectively. The tap 478 is biased to a dead contact 484. When the switch 396 is manually operated, the tap 478 is swung into engagement with a contact 486 that is connected to the line 266 (see FIG. 8) which is the output from the rudder servomotor switch, so that in this position of the manually-operated clutch switch the output from the rudder servomotor feed is led to the line 386 of the rudder servosystem (FIG. 9) whereby to supply control steering power to the rudder servomotor 248. The tap 480 is normally biased into engagement with a dead contact 490. When the tap 480 is depressed upon manual operation of the clutch switch 396, the tap will engage a contact 429 that is connected to the line 466 so that if the mode switch is in its STEER, WIND or COMPASS condition the clutch solenod (FIG. 9) will be engaged to render the clutch oerative, whereby upon turning of the rudder servomotor the rudder will be correspondingly turned as a function of the number of revolutions of said motor. The tap 482 is normally biased away from a dead contact 494 and into engagement with a contact 496, this latter contact being connected by a line 498 to a battery 500. Hence, in the clutch disengage condition of the normally-operated clutch switch an inhibit signal will be supplied to the line 288 which is fed to the OR gate 284 (see FIG. 8) so as to inhibit operation of the servoamplifier for the rudder motor, whereby in clutch disengage position the automatic control of the rudder servoamplifier is negated and the sole signals relied upon to operate the rudder servomotor are those supplied over the lines 270 and 274, thereby overriding automatic signal controls of the rudder by cancelling the same.

Preferably, the mode switch does not have a closed-cycle operation, that is to say, the mode switch operates between limits, one of the limits being the STEER condition and the other limit being the COMPASS condition. The OFF condition is interposed between the STANDBY condition and the STEER condition, and the WIND condition is interposed between the STANDBY condition and the COMPASS condition. This arrangement enables the compass to be stabilized for some desired heading before the automatic pilot is put into automatic operation for the WIND condition and the COMPASS condition. Actually, the compass also is stabilized in the WIND condition so that it remains stabilized when the mode switch is moved over to the COMPASS condition.

By way of further explanation and clarification, there is set forth below a review of the sundry functions of the different operating components of the automatic pilot in the various principal modes (conditions) of operation and in the mentioned sub-modes of two of those principal modes.

There are, as has been mentioned above, five principal modes which are:
 1. the steering mode, sometimes referred to as STEER
 2. the OFF mode,
 3. the STANDBY mode,
 4. the WIND mode, which is a mode in which a sailboat is steered at a constant angle with respect to the apparent wind direction, and
 5. the COMPASS mode in which the sailboat is steered on a constant compass heading even if the required final rudder setting is one other than the initial rudder setting. Such steering is one which holds the rudder to a required setting despite perturbations in ambient parameters such as wind changes and water current changes.

The sub-modes are referred to as "COURSE CHANGE" sub-modes and are applicable only as sub-modes of the principal WIND mode and the principal COMPASS mode.

In the STEER mode, all computed signals are inhibited, and the only signals that reach the rudder servomotor 248 are those generated by manual operation of the steering switch 394. Limit switches 366, 368 restrict outward turning of the rudder 26 in this mode, as they do in the other operational modes, to wit, the WIND mode and the COMPASS mode and in the COURSE CHANGE sub-modes thereof. In the OFF mode, all power is off, except power to the wind direction systems. The rudder servoclutch 348 is disengaged because no power is present and the rudder is controlled solely by physical effort from the steerman's helm 336.

In the STANDBY mode, power is applied to all components of the system via the deck 414. However, the rudder servoclutch cannot be engaged because the contact 412-3 is dead. In addition, the computed signals are inhibited by a signal on the lead 288 so that no inputs are fed to the rudder servomotor from the lead 266. The compass signal generating circuitry described in FIG. 7 is operative. In particular, the inhibit signal on the servoamplifier in the nulling loop 212 for the $\Delta\theta$ potentiometer 214 is removed because the 410-3 contact is not connected to the line 242.

In the WIND mode, without a COURSE CHANGE sub-mode being operative, a wind error signal is developed from the apparent wind error signal generator 114 (FIG. 6) by the relationship between the synchro transmitter CX 122 and the synchro control transformer CT 118 and then fed to the summing junction 246 for the rudder control system 244 (FIG. 8), the rudder clutch 348 being engaged. The output of the summing junction 246 controls the rudder servomotor 248 in such a direction as to reduce the apparent error signal $\Delta\theta$ 214 of the heading due to the apparent wind to zero. This is done by feeding the change of rudder position back along the line 252 to the summing junction 246 in opposition to the apparent wind error signal, if any, appearing in this mode on the lines 152 and 440. As the sailboat returns to the desired heading, both the apparent wind error signal and the rudder feedback signal reduce to zero asymptotically in a manner such as to produce a critically damped boat response. Due to variations in wind vane sensitivities as a function of boat heading, compensation is desirable and supplied to maintain an approximately constant wind error signal sensitivity through the complete azimuth of the boat headings, this being furnished by the gain changer 150 (FIG. 6) having its lowest gain at apparent wind angles of 180° and increasing in both directions therefrom. In addition, it will be observed that in the WIND mode while the rudder clutch is engaged, the steering command meter 290 will be centered between port and starboard indicating that the sailboat is maintaining a correct apparent wind angle.

To aid the steersman in efficient operation of the sailboat while in the WIND mode, the rudder clutch 348 is disengaged and the steersman controls the rudder position himself, for example via the helm, by following the demands of the command meter to turn to either port or to starboard. He only needs to maintain the command meter centered by manipulation of the rudder. The command meter indicates port when the sailboat should be made to go port in order to maintain a desired apparent wind angle. A similar situation prevails for starboard. When manipulating the rudder manually as aforesaid, the steersman controls the position of the rudder in such a fashion that the indicator on the steering command meter approaches and then stays in its central position.

In the COURSE CHANGE sub-mode of the WIND mode, the servotracking motor M 124 (FIG. 6) is caused to turn to port or to starboard by actuating either the starboard or port course change switches 450/454 or 452/456 (FIG. 10) thereby moving the synchro control transformer CR 122 (FIG. 6) which provides a reference for the apparent wind error signal in conjunction with the synchro transmitter CX 118. If the rudder clutch is engaged, as it usually will be at this time, the sailboat automatically will be steered to and maintain the new apparent wind angle. If, on the other hand, the rudder clutch 248 is disengaged during the aforeaid maneuver, the steering command meter will direct the steersman to steer and maintain the new course.

In the COMPASS mode, without the COURSE CHANGE submode being operative, the heading error signal is developed from the $\Delta 74$ potentiometer 214 (FIG. 7) and then fed to the summing junction 246 for the rudder control system (FIG. 8), the rudder clutch being engaged. The output of the summing junction 246 controls the servomotor in such a direction as to reduce the heading error signal to zero. This is done by feeding the change of rudder position back to the summing junction 246 in opposition to the heading error signal. As the sailboat returns to the desired heading, both the heading error signal and the rudder feedback signal reduce to zero asymptotically in a manner such as to produce a critically damped boat response. In addition, it will be observed that in the COMPASS mode while the rudder clutch is engaged, the steering command meter 290 will be centered between port and starboard indicating that the sailboat is maintaining a correct heading.

To aid the steersman in efficient operation of the sailboat while in the COMPASS mode, the rudder clutch is disengaged by depressing the switch 396 whereupon the steersman controls the rudder position, for example, via the helm, by following the demands of the command meter either port or starboard. He only needs to maintain the command meter centered by manipulation of the rudder. The command meter indicates port when the sailboat should be made to go port in order to maintain the desired heading. A similar situation prevails for starboard. When manipulating the rudder manually as aforesaid, the steersman controls the position of the rudder in such as fashion that the indicator on the steering command meter approaches and then stays in the center position.

In the COURSE CHANGE sub-mode of the COMPASS mode, the nulling loop (FIG. 7) is caused to operate by removing the inhibit signal from the servoamplifier 230. This is done by actuating the tap 462 to engage either the port or starboard push contact 474 or 476 (FIG. 10). Thereby, the rudder servomotor 248 is caused to move port or starboard by manual manipulation and the sailboat will continue to turn as directed by the tap 462. When the desired new heading is reached, the course change switch 392 is released whereupon an inhibit signal is re-supplied to the servoamplifier 230 (FIG. 7) which, in turn, creates a new reference for the $\Delta\theta$ potentiometer 234 (FIG. 7) and the automatic pilot now will cause the sailboat to maintain the newly obtained heading.

It thus will be seen that there is provided a device which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described the invention there is claimed as new and desired to be secured by Letters Patent:

1. An automatic pilot for a sailboat having a rubber, a mast and sails supported from the mast, said automatic pilot comprising:
   A. means to provide a first electric signal as a function of the angular position of the rudder,
   B. power means to vary the angular position of the rudder,
   C. means to provide a second electric signal as a function of the prevailing angle of the apparent wind relative to the fore and aft position of the sailboat,
   D. means to provide a third electric signal as a function of a desired angle of apparent wind relative to the fore and aft position of the sailboat,
   E. means responsive to means (C) and (D) to provide a fourth electric signal as a function of the prevailing difference between the second and third electric signals,
   F. means to provide a fifth electric signal as a function of the prevailing heading of the sailboat,
   G. means to provide a sixth electric signal as a function of a desired heading of the sailboat,
   H. means responsive to means (F) and (G) to provide a seventh electric signal as a function of the prevailing difference between the fifth and sixth electric signals, and
   I. a mode selecting means having at least four modes which are OFF, WIND, COMPASS and STANDBY, said mode selecting means being so structured that the selection of WIND mode must be made between a selection of OFF mode and of COMPASS mode and that the STANDBY mode is positioned between the OFF mode and the WIND mode, said selecting means including
      i. means operable when the selecting means is in the WIND mode for connecting the means providing the first and fourth signals to the power means in a control loop which governs the heading of the sailboat to secure and maintain the desired angle of apparent wind relative to the fore and aft position of the sailboat,
      ii. means operable when the selecting means is in the COMPASS mode for connecting the means providing the first and seventh signals to the power means in a control loop which governs the heading of the sailboat to secure and maintain the sailboat in the desired heading,
      iii. said selecting means in the OFF mode providing no connection between the first and fourth electric signals and the power meams and no connection between the first and seventh signals and the power means, and
      iv. means operable when the selecting means is in the STANDBY mode for rendering the means generating the fifth, sixth and seventh electric signals operative.

2. An automatic pilot as set forth in claim 1 in which when the mode selecting means is in the STANDBY mode the means generating the second, the third and the fourth electric signals are operative.

3. An automatic pilot as set forth in claim 1 in which the mode selecting means includes a STEER mode, in which the position of the STEER mode in said mode selecting means is on the side of the OFF mode opposite from the side on which the STANDBY mode is located, in which means is included to provide an eighth electric signal as a starboard signal, in which means is included to provide a ninth electric signal as a port signal and in which whem the mode selecting means is in the STEER mode the eighth and the ninth electric signals are selectively connected to the power means, depending upon which of the eighth and the ninth electric signals is generated.

4. An automatic pilot for a sailboat having a rudder, a mast and sails supported from the mast, said automatic pilot comprising:
   A. means to provide a first electric signal as a function of the angular position of the rudder,
   B. power means to vary the angular position of the rudder,
   C. means to provide a second electric signal as a function of the prevailing angle of the apparent wind relative to the fore and aft position of the sailboat,
   D. means to provide a third electric signal as a function of a desired angle of apparent wind relative to the fore and aft position of the sailboat,
   E. means responsive to means (C) and (D) to provide a fourth electric signal as a function of the prevailing difference between the second and third electric signals,
   F. means to provide a fifth electric signal as a function of the prevailing heading of the sailboat,
   G. means to provide a sixth electric signal as a function of a desired heading of the sailboat,
   H. means responsive to means (F) and (G) to provide a seventh electric signal as a function of the prevailing difference between the fifth and sixth electric signals, and
   I. a mode selecting means having at least three modes which are OFF, WIND and COMPASS, said mode selecting means being so structured that the selection of WIND mode must be made between a selection of OFF mode and of COMPASS mode, said mode selecting means having a sub-mode for the WIND mode and for the COMPASS mode, said selecting means including
      i. means operable when the selecting means is in the WIND mode for connecting the means providing the first and fourth signals to the power means in a control loop which governs the heading of the sailboat to secure and maintain the desired angle of apparent wind relative to the fore and aft position of the sailboat,
      ii. means operable when the selecting means is in the COMPASS mode for connecting the means providing the first and seventh signals to the power means in a control loop which governs the heading of the sailboat to secure and maintain the sailboat in the desired heading, and
      iii. said selecting means in the OFF mode providing no connection between the first and fourth electric signals and the power means and no connection between the first and seventh signals and the power means,
   J. the sub-mode including means to generate an eighth electric signal which is a starboard signal, means to generate a ninth electric signal which is a port signal and means to selectively connect the eighth or ninth electric signal in the compass control loop when the mode selecting means is in the COMPASS mode and in the apparent wind loop when the mode selecting means is in the WIND mode, the eighth electric signal or the ninth electric signal, whichever is selected, being fed into the control loop for the associated mode so as to vary the third electric signal when the mode selecting means is in the WIND mode.

5. An automatic pilot as set forth in claim 4 in which the tenth electric signal or the eleventh electric signal, whichever is selected, is fed into the control loop for the associated mode so as to vary the sixth electric signal when the mode selecting means is in the COMPASS mode.

6. An automatic pilot for a sailboat having a rudder, a mast and sails supported from the mast, said automatic pilot comprising:
  A. means to provide a first electric signal as a function of the angular position of the rudder,
  B. power means to vary the angular position of the rudder,
  C. means to provide a second electric signal as a function of the prevailing angle of the apparent wind relative to the fore and aft position of the sailboat,
  D. means to provide a third electric signal as a function of a desired angle of apparent wind relative to the fore and aft position of the sailboat,
  E. means responsive means (C) and (D) to provide a fourth electric signal as a function of the prevailing difference between the second and third electric signals,
  F. means to provide a fifth electric signal as a function of the prevailing heading of the sailboat,
  G. means to provide a sixth electric signal as a function of a desired heading of the sailboat,
  H. means responsive to means (F) and (G) to provide a seventh electric signal as a function of the prevailing difference between the fifth and sixth electric signals,
  I. a mode selecting means having at least three modes which are OFF, WIND and COMPASS, said mode selecting means being so structured that the selection of WIND mode must be made between a selection of OFF mode and of COMPASS mode, said selecting means including
    i. means operable when the selecting means is in the WIND mode for connecting the means providing the first and fourth signals to the power means in a control loop which governs the heading of the sailboat to secure and maintain the desired angle of apparent wind relative to the fore and aft position of the sailboat,
    ii. means operable when the selecting means is in the COMPASS mode for connecting the means providing the first and seventh signals to the power means in a control loop which governs the heading of the sailboat to secure and maintain the sailboat in the desired heading, and
    iii. said selecting means in the OFF mode providing no connection between the first and fourth electric signals and the power means and no connection between the first and seventh signals and the power means,
  J. means to generate a port electric signal,
  K. means to generate a starboard electric signal, and
  L. means to feed either the port electric signal or the starboard electric signal, as the case may be, to the power means and, also, when either the port electric signal or the starboard electric signal is energized, to disable the connecting means operable when the mode selecting means is in the WIND mode or the COMPASS mode.

* * * * *